Feb. 16, 1937. H. L. BLUM 2,070,879
FLUID METER
Filed April 24, 1933

INVENTOR.
Hosmer L. Blum.
BY
ATTORNEY.

Patented Feb. 16, 1937

2,070,879

UNITED STATES PATENT OFFICE 2,070,879

FLUID METER

Hosmer L. Blum, San Francisco, Calif.

Application April 24, 1933, Serial No. 667,663

12 Claims. (Cl. 73—244)

This invention relates to meters for measuring liquids, fluids, gases and the like, and more particularly to meters of that type which are operated by the medium which they measure.

It is one object of this invention to provide an improved meter for measuring liquids, fluids, gases and the like.

It is another object to provide an improved meter that shall be operable by the medium which it measures.

Another object is to provide an improved meter that shall operate by very low head pressure, whereby the same may be used for measuring light or heavy fluids or gases.

Another object is to provide in a meter having the above characteristics, novel construction of the meter parts that shall provide sufficient area subjected to the fluid passing through the meter to insure a positive operation of the device irrespective of the variation of the head pressure of the medium being measured.

Another object is to provide an improved meter of the type employing a plurality of cylinders having pistons therein, wherein the fluid supply to and from the cylinders is controlled by a single valve, the latter being operated by the movement of the pistons during the measuring process.

Another object is to provide in a meter having the above characteristics, a novel form of valve for controlling the fluid supply to and from the meter cylinders.

A further object is to provide in a meter, a single valve of novel construction for controlling the fluid supply to and from the meter cylinders, and novel means for supporting said valve within the meter independent of contact with the cooperating surface of the cylinder ports.

The above and other objects will be made apparent in the further description of the novel construction and combination of parts of the invention hereinafter described and illustrated in the accompanying drawing, wherein like reference characters refer to like parts. It is to be expressly understood that the drawing is not a definition of the invention but is merely one form of a construction illustrating a preferred embodiment of the invention. The invention will be defined by the appended claims.

In the drawing:—

Figure 1:
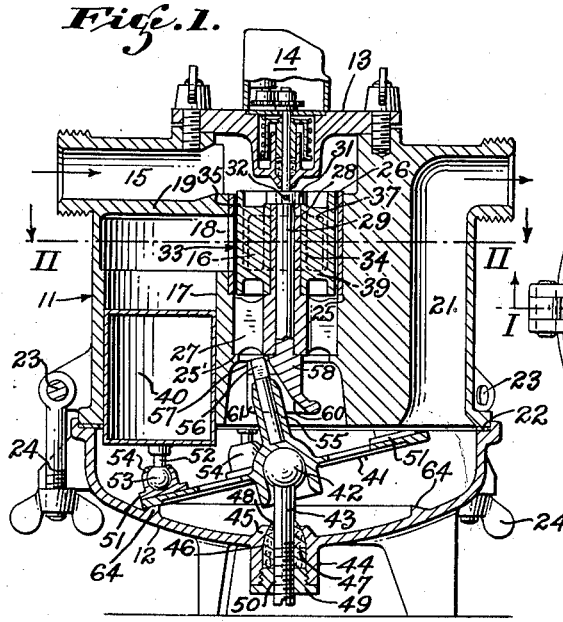
Figure 1 is a sectional view taken on the line I—I of Fig. 2.
Figure 2:
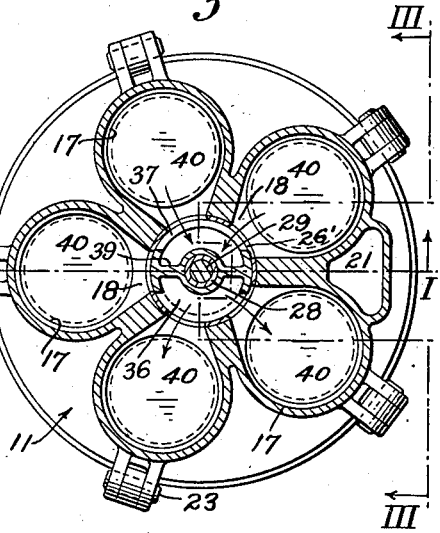
Figure 2 is a sectional view taken on the line II—II of Fig. 1.
Figure 3:
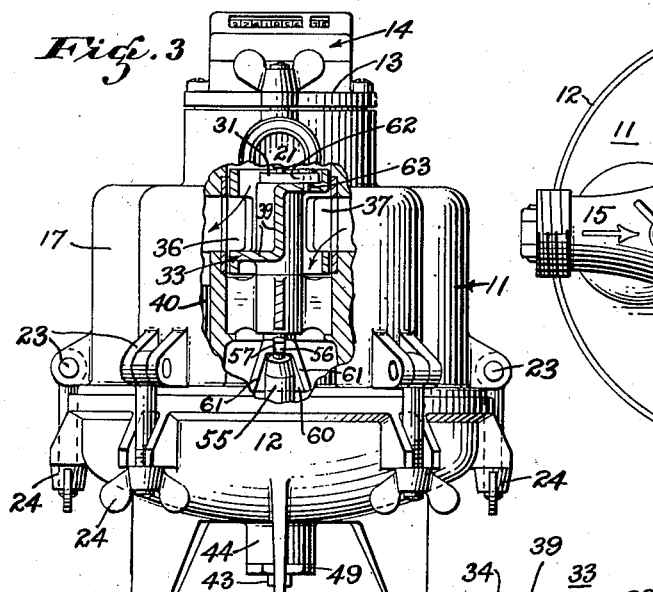
Figure 3 is an elevational view having a portion broken away in order to show a section taken on the line III—III of Fig. 2.
Figure 4:
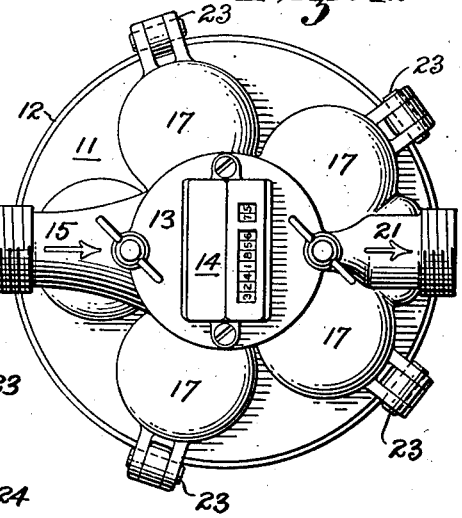
Figure 4 is a top plan view of the meter illustrated in Figs. 1 to 3.
Figure 5:
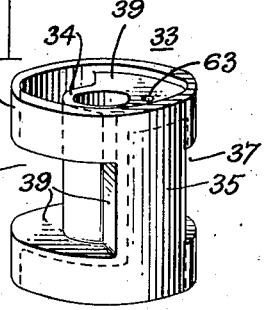
Figure 5 is a perspective view illustrating one form of the novel valve employed for controlling the fluid supply to and from the meter cylinders.

In the form shown, Figures 1 to 4 inclusive illustrate different views of a preferred form of a meter embodying the invention.

The present meter is simple in structure and possessed of a minimum number of parts, to all of which access may be had readily for the purpose of inspection, repair and cleaning. The meter comprises a casing or main body portion which provides a cylinder block, represented in its entirety by 11, a bottom closure 12 and a top 13, the latter adapted to include or accommodate any selected indicating device, represented in its entirety by 14. The indicating device 14 may be of any suitable type, and does not represent a part of the present invention. The cylinder block or main body portion 11 may consist of a unitary casting, wherein there is provided in the upper portion thereof an intake conduit or passageway 15 having communication with a cylindrical vertical opening 16 extending through the center of the body 11 and providing a valve chamber. Provided within the body 11 are a plurality of vertical cylinders 17. The cylinders 17 are circumferentially disposed about the central opening or valve chamber 16 and each cylinder is provided with an opening or cylinder port 18 through its inner side wall and adjacent the top thereof, the cylinder ports 18 serving as a common inlet and outlet to and from their respective cylinders to the valve chamber 16. Each of the cylinders are closed at their top by a cylinder head 19 which is preferably an integral portion of the body 11, as shown. The body portion 11 is further provided with a vertical outlet conduit opening 21, the latter preferably being disposed in the opposite side of the body 11 from the inlet passageway 15 and intermediate a pair of adjacent cylinders 17.

The bottom closure 12, which is preferably of cup-shape providing a chamber underlying the cylinders as shown, is provided with suitable means on its peripheral edge for forming a leak-proof contact with the lower outer edges of the body 11, as shown at 22. The body 11 is provided with a plurality of clamping means 23 adapted to releasably engage cooperating clamping members 24 carried by the bottom closure 12 for releasably connecting the closure 12 to the body portion 11.

The opening 16 is counterbored to form a shoulder intermediate its vertical height, as shown at 25, for receiving and supporting a bushing 26. The bushing 26 is provided with openings 26', the latter adapted to register with the cylinder ports 18 provided in the cylinder walls. The opening 16 is also counterbored for providing a shoulder, as shown at 25', for receiving and removably supporting a plurality of supporting webs 27. The webs 27 are adapted to support a vertically disposed tubular bearing 28. The tubular bearing 28 is disposed concentrically of the opening 16 and adapted to receive and turnably support a vertical shaft 29. The top of the shaft 29 is provided with a collar 31, the latter being rigidly connected to the upper end of the shaft by means of a pin 32, the diameter of the collar 31 being greater than the opening in the tubular bearing 28 and adapted to rest upon the upper end of the bearing 28, for supporting the shaft 29. The shaft 29 is adapted to rotatively operate a novel valve 33 which is seated within the upper portion of opening or chamber 16. The valve 33 is a tubular shell which is exteriorly cylindrical or generically cylindroidal in shape and partially open at its respective ends, is provided with a tubular bearing surface 34 positioned concentrically of the cylindrical valve wall 35 and spaced therefrom. Within the cylindrical wall 35 of the valve 33 is provided a pair of diametrically oppositely disposed valve port openings 36 and 37. The openings 36 and 37 are adapted to register with the cylinder ports 18 in the several cylinders 17. The valve ports 36 and 37 are separated, one from the other, by a partition or wall 39, provided within the valve 33, and separating the interior of the valve 33 into two separate conduits, the port 36 being connected by one conduit with an upper open end portion of the cylindrical valve 33 and the port 37 being connected by the other conduit with a lower open end portion of the valve 33. By designating the exterior wall of the shell of valve 33 as cylindrical, it is not intended to restrict said term to an exact cylinder, the term being used generically to include a shell-like body which is circular in lateral transverse cross-section.

It will now be understood that upon rotation of valve 33, the intake passageway will successively communicate with the several cylinders 17 by way of the passageway 36 through the valve 33 communicating with the ports 18, and that the bottom chamber formed by closure 12 will successively communicate with the several cylinders 17 by way of the lower portion of the cylindrical opening 16 within the body 11 and the passageway 37 through the valve 33 communicating with the ports 18, so that as the valve 33 is rotated, the several cylinders 17 will be alternately connected with the intake passageway 15 and with the chamber formed by closure 12, the said chamber being in communication with the outlet conduit passageway 21.

It is expressly pointed out here that the valve 33 is supported concentrically of the opening 16 by the tubular bearing 28 and is supported vertically adjacent the top of said bearing on a shoulder, thus permitting use of a relatively short cylindrical rotary valve which is thus supported independent of bearing contact with the opposing adjacent surfaces of the bushing 26 disposed in the openings 16, the independence of contact being very small, say two thousandths of an inch, so that leakage around the valve may be prevented by a liquid seal of fluid in transit through the meter. This is an important feature of the invention, as by mounting the valve 33 independent of bearing contact on the opposing surfaces of the bushing 26, the resistance in rotating the valve 33 is materially reduced and permits the device to operate with a minimum head pressure.

Improved means are provided for rotating the valve 33, and for the sake of simplicity, the means will be described in sequence with its operation. Within each of the cylinders 17 is provided a piston 40. The pistons 40 may be hollow and, if desired, possessed of a degree of buoyancy. Mounted within the chamber formed by bottom closure 12 is a disc or circular plate 41. The latter is fulcrumed in its center upon a spherical shaped member 42, the spherical member 42 being mounted on the top of a vertical rod 43, or the spherical member 42 may be an integral part of the rod 43. The rod 43 is preferably threaded for support through the center of the closure 12, and novel means is provided for adjustably supporting the rod 43, which means comprises a flange 44 depending centrally of closure 12 and having a concentric internally threaded opening therethrough. The flange 44 terminates with a lip portion 45 extending upwardly and inwardly for forming a tapered conelike seat 46 for receiving a novel packing 47. The packing 47 is provided with an opening therethrough for receiving cooperating portions of the rod 43. The upper outer edges of the packing 47 are formed to provide radially inwardly curved portions 48, the curvature of which is adapted to correspond to the curvature of the seat 46 within the flanged portion 45, for forming a neat, compact leak-proof connection. The packing 47 terminates upwardly of the flanged portion 45 within the bottom chamber for the purpose of eliminating crevices between the adjacent portions of the packing 47 and flanged portion 45 whereby the parts may be readily sterilized and kept clean.

Within the internally threaded flanged portion 44 is provided a threaded member 49 having a threaded opening 50 therethrough, adapted to engage and cooperate with threads provided on the lower end of the rod 43, whereby the rod 43 may be adjusted to terminate at any desired elevation within the case 12.

Each of the pistons 40 are operably connected with the upper top peripheral surface of the disc 41 by means of a contact shoe 51 adapted to rest on the peripheral surface of the disc 41, and free for relative movement therewith. The shoe 51 is connected to the bottom of the piston 40 and adapted for universal movement therewith by means of a universal connection 52. The universal connection 52 may include a spherical member 53 adapted to seat within a plurality of resilient holding claws 54 carried by the shoe 51. Extending upwardly from the center of the disc 41 is provided an actuating lever 55, the latter having an elongated opening disposed longitudinally thereof and adapted to turnably support a connecting pin 56. The upper end of the pin 56 terminates in a portion which is preferably rectangular or square in cross section for engaging an opening or yoke 57 of like shape provided in a crank member, represented in its entirety by 58. The crank member 58 is carried by the lower end of the shaft 29 and may be an integral part thereof. The opening or yoke 57 in the crank member 58 is offset from the axis of rotation of the shaft 29 and connects the pin 56 in cranking relation with the shaft 29. The crank member 58 is constructed to provide a guideway for guiding the pin 56 into and out of engaging relation with the opening 57. The guideway consists of an incline portion 60 having spaced lateral projections 61 extending outwardly from the incline portion 60, whereby the pin will be automatically guided to the opening 57 during the assembling of the associated parts.

It will now be apparent that on admission of fluid under pressure into the passageway 15, that the same will be admitted into and discharged from successive cylinders by way of the valve 33, valve ports 36 and 37 and the cooperating cylinder ports 18 in the cylinder 17, causing the operation of the pistons 40 within the cylinders 17 to impart a wabbling movement to the disc 41. This movement of the disc 41 will cause the upper end of the pin 56 to travel in a circle and rotate the shaft 29 by means of the cranking member 58, the shaft 29 being connected to rotate the valve 33 through the collar 31 carried by the top of the shaft 29. The collar 31 is provided with a crank arm 62 which may be an integral part of the collar 31, the outer end of the crank arm 62 being connected to the upper portion of the partition 39 within the valve 33 by means of a pin extending through the outer end of the crank arm 62 and into engagement with an opening 63 provided in the upper portion of the partition 39 within the valve 33.

As above stated, means is provided for adjusting the elevation of the fulcrum 42 of the disc 41. There is also provided novel means for regulating the downward fulcrum movement of the disc 41, which means comprises an annular projection 64 extending upwardly from the inner face of closure member 12 which provides an annular track for wobble plate 41. The annular projection 64 may be an integral part of the closure 12, and is positioned concentrically of the vertical axis thereof. Since the annular projection 64 determines the downward movement of the fulcrumed disc 41, it can be readily understood that by adjusting the height of the fulcrum 42 supporting the disc 41, that the stroke of the several pistons 40 may be adjusted as desired for obtaining a proper setting of the device and rendering the device adjustable for use with any selected indicating device.

The operation of the device is as follows:—

The medium to be measured is supplied through the intake passageway 15, which is in direct communication with the upper open end of the valve 33. The medium passes through the passageway within the valve 33 associated with the valve port 36 in the valve wall 35, thus supplying the medium to the cylinders 17 successively by way of the respective cylinder ports 18. The pressure of the medium within the cylinders 17 operates to successively move the several pistons 40 downward, which movement imparts the required progressive wobbling movement of the disc 41 on the fulcrum 42. During the downward movement of certain of the pistons it will be obvious that upward movement is imparted to other cooperating pistons in accordance with the wabbling movement of the disc 41. During the upward movement of each of the pistons 40, the medium will be forced through the cooperating cylinder port 18 and through the passageway of valve port 37 through the valve 33, which registers with the respective cylinder port 18, thence through the lower open end of the valve 33, and into the bottom chamber through webs 27 and out the passageway 21.

The present meter comprises a minimum number of parts, thereby rendering it cheap to manufacture, easy to assemble and disassemble for inspection, repair and cleaning. Other important features of the invention reside in the means for operably connecting the pin 56 with the crank member 58 carried by the lower end of the shaft 29, including means for guiding the pin to its proper connecting position with the cranking means 58; also the means for operably connecting the piston 40 with the peripheral surface of the disc 41, which means eliminates the necessity of guide rods for maintaining the pistons and the disc 41 in proper operating relation.

Another important feature of the invention is the manner in which the valve 33 is concentrically mounted within the opening 16 of the body 11, which mounting is independent of and adapted to operate free from frictional contact with the opposing surface of the cylinder walls. This greatly eliminates resistance in the turning movement of the valve and permits the meter to operate with a greatly reduced head pressure. The upper end of the shaft 29 may be connected to any selected indicating means 14 in any manner that may be desired. The indicating means 14, illustrated in the drawing, is merely shown for the purpose of illustrating a complete operable structure.

Attention is directed to the simplicity in which the present device may be assembled and disassembled. In order to disassemble the device it is only necessary to loosen the cooperating clamp members 23 and 24 carried by the body 11 and closure 12 respectively, after which time closure 12 may be removed together with the fulcrumed disc 41 and the pistons 40. By also removing the top 13, the indicating mechanism may be readily removed, as well as the shaft 29, valve 33, tubular bearing 34, which completes the entire disassembling of the device. These parts may be readily sterilized and replaced.

It will also be noted that the disassembling of the device does not interfere, in any way, with the adjustment of the device, since the novel packing 48 associated with the fulcrum rod 43 renders the closure 12, fulcrum rod 43 and the associated connecting parts sterilizable without disassembling, one from the other. The guide means provided on the crank means 58 operates to readily guide the pin 56 to its proper position within the opening 57 in the crank means 58.

The present device is efficient, simple, durable and comparatively cheap to manufacture.

While I have illustrated and described a preferred embodiment of the invention, it will now be apparent to those skilled in the art that certain changes, modifications, substitutions, additions and omissions may be made in the structure without departing from the spirit and scope of the invention as defined by the appointed claims.

I claim:—

1. A meter for measuring fluids including a main body portion having a plurality of circumferentially disposed cylinder chambers and having a cylindrical valve chamber, said cylinder chambers each having a cylinder port communicating with said valve chamber, a reciprocable piston in each of the respective cylinder chambers, a stationary removably mounted tubular bearing co-axial with the valve chamber, a cylindrical rotary valve disposed in said valve chamber and having bearing support on said bearing for rotation thereon, means for rotating said valve responsive to reciprocation of the pistons, said last mentioned means including a wobble plate having an operative connection with said pistons and a shaft rotatably mounted in said tubular bearing and rotatable by said wobble plate, said shaft being connected to said valve.

2. A meter comprising a body portion provided with a transverse partition wall dividing the interior of the body into an inlet chamber and an outlet chamber and having a plurality of ported cylinders disposed in spaced relation about a common center, the central portion of said body having an opening at said common center from the inlet chamber to the outlet chamber and providing a valve chamber adjacent the inlet chamber and a passageway adjacent the outlet chamber, a valve bearing, a valve rotatably mounted in the valve chamber on said bearing and independent of bearing support on the walls of the valve chamber, said valve being adapted upon rotation to open and close each cylinder port, a piston mounted in each cylinder, a wobble plate having operable connection with each piston and provided with an upstanding central lever having an operable releasable connection to the valve, a bowl enclosing said wobble plate, said bowl forming a liquid containing reservoir and being provided with an outlet communicating with the interior of the liquid containing chamber at a point in the reservoir portion thereof and adapted for discharge of all of the liquid which passes through the cylinders, said bowl communicating with the cylinders through said central passageway and through said valve.

3. A meter for fluid comprising a body portion provided with a plurality of ported cylinders disposed in spaced relation about a common center, the central portion of said body portion having an opening providing a valve chamber adjacent the cylinder ports and a passageway from the valve chamber to a reservoir bowl, an axially disposed bearing, a shaft in said bearing, a piston in each cylinder, a rotatable valve in the valve chamber operative to open and close the cylinder ports, said valve being centrally mounted on said bearing and free of bearing support upon the walls of the valve chamber, a connecting member between said shaft and said valve for rotating said valve, a wobble plate connected with the pistons and having a releasable slidable connection to the axially disposed shaft, a bowl enclosing said wobble plate and connections, said bowl forming a liquid containing reservoir and being provided with an outlet, said bowl communicating with the cylinders through said central passage and through said valve.

4. A meter for measuring fluids including a main body portion having a plurality of circumferentially disposed cylinder chambers and having a cylindrical valve chamber centrally of the cylinder chambers, said cylinder chambers each having a cylinder port communicating with said valve chamber, a reciprocable piston in each of the respective cylinder chambers, each of said pistons having mounted at one end a shoe for loosely riding upon a wobble plate, said shoe having a universal joint connection with the piston, a cylindrical rotary valve disposed in said valve chamber, a stationary tubular bearing centrally axially of said valve chamber for rotatably supporting said valve in the valve chamber free of bearing contact with the cylinder wall of the valve chamber, a rotatable shaft in said tubular bearing, said shaft having a crank at its lower end, means operatively connected to the pistons for rotating said valve upon reciprocal movement of said pistons, said last mentioned means including a wobble plate disc upon which the shoes of the pistons ride, said wobble plate having an upstanding central pin loosely engaging the crank of the rotatable shaft.

5. A meter for measuring fluids including a main body portion having an inlet opening and an outlet opening and having a plurality of cylinder chambers circumferentially about and spaced from a common center providing a passageway centrally of the main body having a shoulder support adjacent the lower end thereof, said cylinder chambers each having a cylinder port communicating with said central passageway, a reciprocable piston in each of the cylinder chambers, a stationary bearing centrally of and co-axial with said central passageway and supported removably on said shoulder, said bearing member being open at its lower end to permit fluid to flow therethrough, a cylindrical rotary valve in the upper portion of said passageway, said valve having an axial opening to receive said bearing and being rotatable relative to said bearing, and means operatively connected to the pistons for rotating said valve, said last mentioned means including a support member, a wobble plate loosely fulcrumed on said support and adapted for annular wobbling movement thereon, an upstanding lever centrally of said wobble plate, and a rotatably mounted connecting member operatively connected between said wobble plate lever and said cylindrical valve, said lever and connecting member having slidably loose engagement therebetween.

6. A meter having the elements of claim 5 in which said cylindrical valve is of lesser length than the cylinders and is provided with a pair of separate conduits therethrough which respectively are in communication with respective inlet and outlet openings for fluid in transit and both of which valve conduits are adapted for communication successively with said cylinder ports.

7. A meter as defined in claim 5 in which the rotary valve has a pair of separate conduits therethrough which respectively are in communication with respective inlet and outlet openings for fluid in transit and both of which valve conduits are adapted for communication successively with said cylinder ports, and in which the rotatably mounted connecting member operatively connected between said wobble plate lever and said rotary valve comprises a shaft, said shaft and said lever having operatively therebetween a pivotal connection and a guide portion whereby one may be slidably guided to its pivotal connection with the other.

8. A meter for measuring fluid including a main body portion having an inlet opening, an outlet opening, a plurality of cylinder chambers disposed about and spaced from a common center, and a bowl underlying the cylinders, said spacing of the cylinders providing centrally thereof an opening from the inlet to the outlet, said opening providing at its upper portion a cylindrical valve chamber centrally of the cylinders and providing a support for a valve bearing below the valve chamber, the said cylinder chambers each having a cylinder port communicating with said valve chamber, a reciprocable piston in each of the cylinder chambers, a valve bearing member co-axial with and spaced radially inwardly from the walls of the valve chamber and removably mounted on the valve bearing support in said central opening, said valve bearing member being open at its lower portion for flow of fluid therethrough into the bowl, a cylindrical rotary valve in said valve chamber having its side walls in opposed relation to the side walls of the valve chamber and having oppositely disposed side-wall ports and a port at each of its opposite ends, said valve being mounted at its central portion rotatably on said valve bearing member, and means operatively connected to said pistons for rotating said valve responsive to reciprocation of the pistons, said valve having a pair of separated passageways therethrough each extending from a side wall port to an end port of the valve, said passageways, respectively, providing communication through the valve between successively receiving cylinder chambers and the inlet opening, and between successively discharging cylinder chambers and the outlet opening.

9. A meter for measuring fluids including a main body portion having an inlet opening and an outlet opening, and comprising a pair of releasably connected casing members, one of which members comprises a bowl and the other of which comprises a plurality of cylinder chambers disposed about and spaced from a common center providing a central opening between the cylinders, one end portion of which central opening forms a valve chamber, said cylinder chambers each having a cylinder port communicating with the valve chamber, a reciprocable piston in each of the respective cylinder chambers adapted for movement in one direction responsive to inflow of fluid into the cylinder chamber, a loosely mounted removable unit in said central opening comprising a tubular valve bearing member and a cylindrical rotatable valve mounted on said bearing member of the valve chamber, said valve having its side wall in opposed relation to the side wall of the valve chamber, and having an axial opening therethrough to receive said bearing, and a shaft rotatably mounted in said tubular bearing member and having connection to the valve for unison rotation, and means including a wobble plate mounted in said bowl and loosely connected to said pistons and to said shaft for rotating said shaft and valve responsive to reciprocation of the pistons, the said valve having a pair of separated passageways therethrough, said passageways respectively providing communication between successively receiving cylinder chambers and the inlet opening and between successively discharging cylinder chambers and the outlet opening.

10. A meter for measuring fluids including a main body portion having an inlet opening and an outlet opening and having a plurality of cylinder chambers disposed about and spaced from a common center and providing centrally thereof a valve chamber having a longitudinal axis parallel to the longitudinal axes of the cylinders, said cylinder chambers each having a cylinder port communicating with said valve chamber, a reciprocable piston in each of the respective cylinder chambers adapted for movement in one direction responsive to inflow of fluid into the cylinder chamber, a valve bearing member axially centrally of the valve chamber and spaced radially inwardly from the walls thereof, a valve rotatably mounted in said valve chamber and supported axially centrally for rotation on said bearing member, the side wall of said valve being opposed to the inner face of the wall of the valve chamber, and means connected to said pistons for rotating said valve, said valve comprising a tubular cylindrically formed shell having a pair of separate passageways therethrough, each of said passageways having at one end thereof an opening which successively communicates with the cylinder ports upon rotation of the valve, and said respective passageways having communication at the other ends thereof with the respective inlet and outlet openings of the meter.

11. A meter for measuring fluids including a main body portion having an inlet opening and an outlet opening and having a plurality of cylinder chambers disposed about and spaced from a common center and providing centrally thereof a valve chamber having a longitudinal axis parallel to the longitudinal axes of the cylinders, said cylinder chambers each having a cylinder port communicating with said valve chamber, a reciprocable piston in each of the respective cylinder chambers adapted for movement in one direction responsive to inflow of fluid into the cylinder chamber, a loosely mounted removable valve bearing member axially centrally of the valve chamber and spaced radially inwardly from the walls thereof, a valve rotatably mounted in said valve chamber and supported axially centrally for rotation on said bearing member, the side wall of said valve being opposed to the inner face of the wall of the valve chamber, and means connected to said pistons for rotating said valve, said valve comprising a tubular cylindrically formed shell having a pair of separate passageways therethrough, each of said passageways having one end thereof opening through a side wall of the valve for successively communicating with the cylinder ports upon rotation of the valve, and said respective passageways having communication at the other ends thereof with the respective inlet and outlet openings of the meter.

12. A meter having the elements of claim 11 in which said axial bearing member is provided with a shoulder for vertically supporting the valve adjacent the upper end of the bearing member.

HOSMER L. BLUM.